United States Patent

[11] 3,609,415

[72] Inventor Takehiko Kawada
 Yokohama, Japan
[21] Appl. No. 54,385
[22] Filed July 13, 1970
[45] Patented Sept. 28, 1971
[73] Assignee Denki Onkyo Company Limited
 Nishirokug, Ohoto-ku, Tokyo, Japan

[54] PIEZOELECTRIC TRANSFORMER CIRCUITS
 8 Claims, 5 Drawing Figs.
[52] U.S. Cl. .................................... 310/8.1,
 310/8.2, 310/9.8, 321/8
[51] Int. Cl. .................................... H01v 7/00
[50] Field of Search ............................ 310/8.1,
 8.2, 9.8, 9.7, 8.9, 8.5, 8.7, 9.6; 331/116, 155, 158,
 163; 323/22 Z; 321/8; 333/72

[56] References Cited
UNITED STATES PATENTS
2,975,354 3/1961 Rosen .......................... 310/8.1 X
3,487,239 12/1969 Schafft ......................... 310/8.2 UX
3,537,039 10/1970 Schafft ......................... 310/9.8 X
3,263,092 7/1966 Knauss ......................... 323/22 Z Primary Examiner—Milton O. Hirshfield
Assistant Examiner—B. A. Reynolds
Attorney—Chittick, Pfund, Birch, Samuels & Gauthier ABSTRACT: In a piezoelectric transformer circuit wherein a high voltage is produced at the output electrode of the piezoelectric transformer by applying a driving voltage of a frequency equal or close to the resonance frequency of the piezoelectric transformer across the driving electrodes thereof, a DC voltage is impressed upon the driving electrode to vary the resonance frequency to regulate the output voltage characteristics.

PATENTED SEP 28 1971          3,609,415

INVENTOR
TAKEHIKO KAWADA

BY Chittick, Pfund,
Birch, Sammels & Gauthier
ATTORNEYS

PIEZOELECTRIC TRANSFORMER CIRCUITS

BACKGROUND OF THE INVENTION

This invention relates to improvements of a piezoelectric transformer circuit and more particularly to a piezoelectric transformer circuit of improved voltage regulation and capable of generating maximum outputs.

Many efforts have recently been made to provide practical construction of a piezoelectric transformer circuit because of its small size, light weight and long life different from a conventional transformer including a magnetic core and windings.

As is well recognized in the art the piezoelectric transformer functions to step-up voltage only at or near its resonance frequency (the frequency of the mechanical vibration) determined by the composition of material, physical dimensions and configuration thereof and generates a maximum output voltage when the frequency of a driving voltage impressed across its driving electrodes coincides with said resonance frequency.

For this reason, if it were possible to adjust the resonance frequency of the piezoelectric transformer by some means it would be possible to utilize it at the highest efficiency or to regulate the output to a desired value, thus enlarging its field of use.

However, a high-voltage generating circuit utilizing a piezoelectric transformer is inadvantageous in that its voltage relation is low. In other words although the piezoelectric transformer can generate a high voltage, this high output voltage greatly varies in response to the variation in the load current caused by the variation in the load resistance.

SUMMARY OF THE INVENTION

It is therefore an object of this invention to provide an improved piezoelectric transformer circuit capable of varying the resonance frequency by applying a DC potential across the driving electrodes without the necessity of changing the physical dimension, configuration and construction of a piezoelectric transformer oscillating at its natural frequency.

Another object of this invention is to provide a novel piezoelectric transformer circuit wherein the resonance frequency is varied so as to produce an output of the desired value without changing the physical size, configuration and construction of a piezoelectric transformer vibrating at a particular frequency.

Still another object of this invention to provide an improved piezoelectric transformer circuit which can operate at high efficiencies regardless of certain variations in the characteristics of the piezoelectric transformer.

Yet another object of this invention is to provide a novel piezoelectric transformer circuit wherein the resonance frequency of the piezoelectric transformer is automatically decreased upon variation in the load thereof so as to maintain the high-voltage output of the piezoelectric transformer at a substantially constant value.

Further object of this invention is to provide an improved piezoelectric transformer having a temperature compensation ability afforded by automatically decreasing the resonance frequency when the output of the piezoelectric transformer varies in response to temperature rise.

Briefly stated, in accordance with this invention there is provided a piezoelectric transformer circuit comprising a piezoelectric transformer including a pair of driving electrodes and a high-voltage output electrode, a source of driving voltage connected across said driving electrodes, a rectifier circuit connected to said output electrode, a load connected to said rectifier circuit and means to apply a DC voltage to at least one of the driving electrodes whereby to vary the natural mechanical resonance frequency of the piezoelectric transformer. The source of the DC voltage may be an independent source of variable DC voltage.

In a modified embodiment of this invention a nonlinear element and an impedance element connected in series therewith are provided to bypass the output voltage of the rectifier circuit exceeding a predetermined value and the voltage drop across the impedance element is applied to one of the driving electrodes to vary the resonance frequency of the piezoelectric transformer thus decreasing its output voltage.

Further objects and advantages of the invention will be more fully understood from the following description taken in conjunction with the accompanying drawing in which.

DESCRIPTION OF THE PREFERRED EMBODIMENTS

Figure 1:
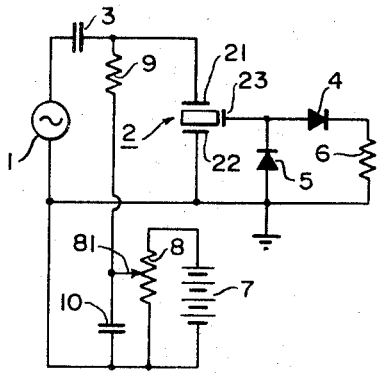
FIG. 1 shows a connection diagram of a piezoelectric transformer circuit embodying this invention.

The embodiment of this invention illustrated in FIG. 1 comprises a piezoelectric transformer 2 and a source of sine wave AC voltage having a frequency equal or close to the resonance frequency of the piezoelectric transformer. The piezoelectric transformer has a pair of driving electrodes 21 and 22 (electrode 22 may be grounded) at one end of a substrate and an output electrode 23 at the opposite end. Driving electrodes 21 and 22 are connected across the source 1 through capacitor 3. The output electrode 23 is connected to a pair of high voltage diodes 4 and 5 comprising a voltage multiplying and rectifying circuit to supply a high-voltage rectified current to a load resistor 6. Capacitor 3 is a nonpolar capacitor of a relatively large capacity to provide a sufficiently low reactance for the input impedance of the piezoelectric transformer and functions to block a DC component. The resistance of the high-voltage load 6 may range from infinity to about 100 megohms. Thus, when a sine wave voltage having a frequency equal to the resonance frequency of the piezoelectric transformer is applied across driving electrodes 21 and 22 thereof from source 1, a stepped up high voltage is produced at the output electrode 23 in a manner well known in the art. According to this invention, a DC source 7 is added to the known piezoelectric transformer above and a variable resistor 8 is connected across the source 7. A movable tap 81 of variable resistor 8 is connected to the driving electrode 21 of the piezoelectric transformer 2 via a resistor 9 to apply a variable DC voltage. Resistor 9 may be a high voltage DC resistor. A capacitor 10 connected between the movable tap 81 and the grounded terminal of source 7 functions to bypass an AC component supplied through the resistor 9.

It was found that when an AC voltage having a frequency equal or close to the resonance frequency of the piezoelectric transformer 2 is impressed across the driving electrodes 21 and 22 thereof from source 1 and when the DC voltage applied to the driving electrode 21 is varied by means of the movable tap 81 of the variable resistor 8, the resonance frequency of the piezoelectric transformer has decreased with the increase in the magnitude of the applied DC voltage. Following is the result of such an experiment. The resonance frequency of a piezoelectric transformer was 31,965 Hz. when the applied DC voltage was zero. When the DC voltage was increased to 362 volts, the resonance frequency of the piezoelectric transformer was decreased to 31,908 Hz. With another piezoelectric transformer exhibiting a resonance frequency of 63,683 Hz. at zero DC voltage, increase of the DC voltage to 362 volts resulted in a decrease of the resonance frequency to 63,569 Hz.

This result shows that the resonance frequency (at which a maximum output is produced) of a piezoelectric transformer is decreased by the application of a DC voltage across its driving electrodes and that the decrease in the resonance frequency is proportional to the magnitude of the applied DC voltage.

Figure 2:
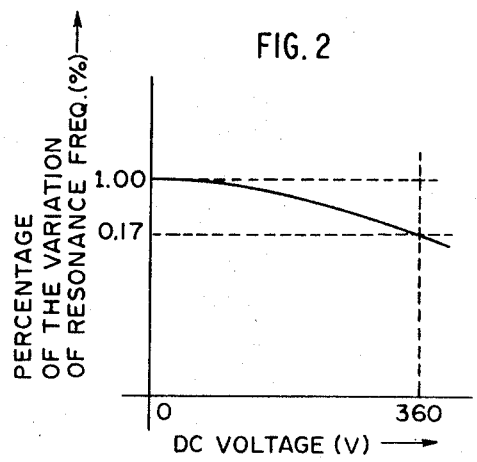
FIG. 2 shows a characteristic curve to explain the operation of the circuit shown in FIG. 1.

More particularly, as shown in FIG. 2, as the DC voltage is increased the resonance frequency of the piezoelectric transformer decreases. For example, for a piezoelectric transformer having a resonance frequency of 31,965 Hz. the percentage variation of the resonance frequency is 0.174 percent at an impressed DC voltage of 362 volts, whereas for a piezoelectric transformer having a resonance frequency of 63,683 Hz. the percentage variation of the resonance frequency is 0.170 percent at the same impressed DC voltage.

In this manner, as it is possible to adjust the resonance frequency of a piezoelectric transformer by varying the DC voltage it becomes possible to operate the piezoelectric transformer at a high efficiency even when the frequency of the driving source is constant as in the high voltage output circuit of a television receiver. In such an application, the dimension and configuration of the piezoelectric transformer are preset such that it will have a resonance frequency slightly higher than the frequency of the driving source (as above described, although the resonance frequency differs slightly from one piezoelectric transformer to the other, it is sufficient to have the lowest resonance frequency equal to the frequency of the driving source). Then, as it becomes possible to decrease the resonance frequency by superposing a DC voltage of proper magnitude upon the driving voltage any piezoelectric transformer can be operated at a high efficiency. In addition, since it is possible to control the output voltage of the piezoelectric transformer by varying the applied DC voltage it becomes possible to provide a high output voltage of any desired value.

Figure 3:
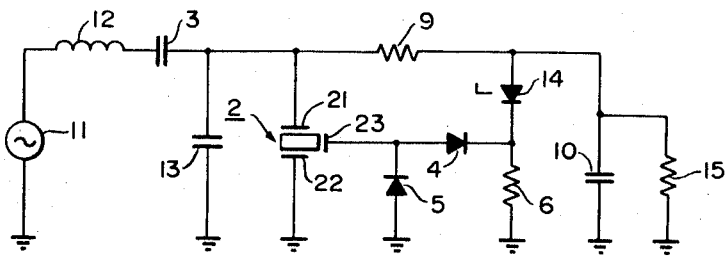
FIG. 3 shows a connection diagram of a modified embodiment of this invention.

FIG. 3 shows a modified piezoelectric transformer circuit of this invention wherein the voltage regulation is improved. As above described, this invention is directed to the improvement of voltage regulation, in other words elimination of variations in the high output voltage of the piezoelectric transformer caused by the variation in the load current. To this end, according to this invention a nonlinear element is connected across the output side of a rectifier circuit which rectifies the high output voltage derived from the output electrode of the piezoelectric transformer. With this arrangement, when the output voltage exceeds a predetermined value as determined by the characteristic of the nonlinear element a portion of the rectifier output is bypassed to flow through an impedance element via the nonlinear element. The voltage drop across the nonlinear element is applied across the driving electrodes of the piezoelectric element to decrease the resonance frequency thereof whereby to maintain the output voltage at a substantially constant value.

FIG. 3 shows a connection diagram of one embodiment of this invention as applied to a high voltage output circuit of a television receiver. In this figure, circuit components identical to those shown in FIG. 1 are designated by the same reference numeral. The circuit shown in FIG. 3 comprises a source of pulse voltage 11 having the same frequency as the horizontal scanning frequency. The pulse voltage of the source 11 is shaped into a sine wave voltage by means of a series resonance circuit comprising an inductor 12 and a capacitor 13 and is then impressed across driving electrodes 21 and 22 of a piezoelectric transformer 2. Where the series resonance circuit is designed to resonate at twice or four times frequency, the pulse voltage from the source 11 is shaped into a sine wave while at the same time stepped up. The purpose of a capacitor 3 connected between inductor 12 and capacitor 13 is to block a DC component and the juncture between these capacitors 3 and 13 is connected to the driving electrode 21. As is well known in the art, the purpose of shaping the pulse voltage into sine wave by the series resonance circuit is to improve the operating efficiency of the piezoelectric transformer 2.

Figure 4:
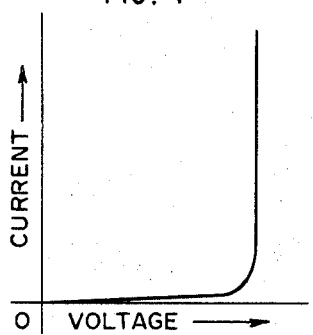
FIG. 4 is a plot to illustrate a voltage viz current characteristic curve of a nonlinear element employed in this invention and FIG. 5 shows output characteristic curves to explain the operation of the embodiment shown in FIG. 3.

As above described, according to this invention a nonlinear element 14 is connected across output terminals of a rectifier circuit comprised by high voltage rectifier diodes 4 and 5 which are connected to the high voltage output electrode 23 of the piezoelectric transformer 2. More particularly, the negative electrode of the nonlinear element 14 is connected to the juncture between the negative electrode of rectifier diode 4 and a high voltage load resistor 6 while the positive electrode of the nonlinear element is grounded through an impedance element such as a resistor 15. As the nonlinear element 14 an asymmetrical varistor having a voltage current characteristic as shown in FIG. 4 is preferred. However, the nonlinear element 14 may be a symmetrical varistor. The juncture between the positive electrode of the nonlinear element 14 and resistor 15 is connected to the driving electrode 21 of the piezoelectric transformer 2 via a resistor 9 to impress a DC potential to the driving electrode 21. A suitable capacitor 10 is connected in parallel with resistor 15 to bypass an AC component supplied through resistor 9.

Figure 5:
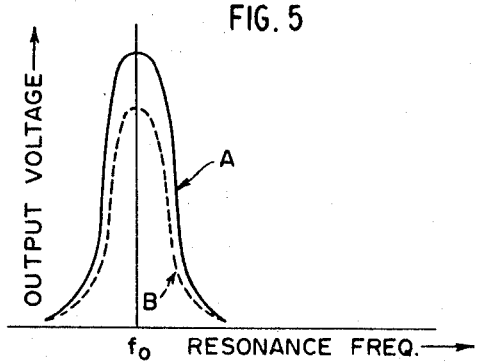

Assuming now that, the nonlinear element is not connected and that the high voltage load resistor 6 (in this example, corresponds to the anode electrode of a cathode ray tube) is at the no load condition, an output voltage which becomes maximum at the resonance frequency $f_o$ as shown by a solid curve A in FIG. 5 will be produced at the high voltage output electrode 23 of the piezoelectric transformer 2. Whereas when the load resistor 6 has a predetermined value the output voltage will be decreased as shown by a dotted line curve B which is also maximum at the resonance frequency $f_o$. Thus the output voltage is decreased than at the no load condition. These output voltage curves A and B were obtained when the frequency of the source 11 was varied near the resonance frequency $f_o$ of the piezoelectric transformer 2.

Now it is assumed that the frequency of the source 11 coincides with the resonance frequency of the piezoelectric transformer 2 (maximum output) when no DC voltage is impressed upon the piezoelectric transformer, or current does not flow through the nonlinear element 14 and that the nonlinear element 14 has a characteristic that passes a large current when the voltage (e.g., the rectified voltage) impressed thereacross exceeds the maximum output voltage shown by the dotted line curve B of FIG. 5. Then as long as the load resistor 6 has a normal value, the high output voltage will follow curve B and no appreciable current flows through the nonlinear element 14. Consequently, as no DC voltage is impressed upon the driving electrode of the piezoelectric transformer 2, its resonance frequency remains at $f_o$.

On the other hand, should the load resistor 6 be decreased to no load condition or increased to an extremely large value, the high output voltage would tend to increase to a value represented by curve A. However, as above described, when the output voltage exceeds the maximum value of curve B, a portion of the rectified output is bypassed by the nonlinear element 14 to create a voltage drop across resistor 15. Since this voltage drop increases in proportion to the magnitude of the output voltage, a DC voltage proportional to the increase in the output voltage is impressed upon the driving electrode 21 of piezoelectric transformer. As a consequence, the resonance frequency thereof is decreased to a value lower than the resonance frequency $f_o$ in proportion to the magnitude of the impressed DC voltage thus decreasing the maximum output voltage of the piezoelectric transformer. In this manner, as the high output voltage increases the resonance frequency of the piezoelectric transformer 2 is decreased to lower its maximum output voltage thus restraining it form rising. Thus, the high output voltage is regulated at a substantially constant value irrespective of the variation in the load. In other words, this invention improves the voltage regulation of a high voltage generating circuit utilizing a piezoelectric transformer.

While the resonance frequency of a piezoelectric transformer increases with temperature rise, the novel circuit can also compensate for the effect of temperature rise because it functions to decrease the resonance frequency of the piezoelectric transformer by applying thereto a DC voltage.

Although the invention has been shown and described in terms of preferred embodiments thereof it to be understood that many changes and modifications will occur to those skilled in the art without departing from the true spirit and scope of the invention as defined in the appended claims.

What is claimed is:

1. A piezoelectric transformer circuit comprising a piezoelectric transformer including a pair of driving electrodes and a high voltage output electrode, a source of driving voltage connected across said driving electrodes, a rectifier circuit connected to said output electrode, a load connected to said rectifier circuit and means to supply a DC voltage to at least one of said driving electrodes, whereby to vary the natural mechanical resonance frequency of said piezoelectric transformer.

2. The piezoelectric transformer circuit according to claim 1 wherein said DC supply means comprises a source of variable voltage.

3. The piezoelectric transformer circuit according to claim 1 wherein said rectifier circuit steps up the voltage by a factor of an even integer.

4. The piezoelectric transformer according to claim 1 which further comprises a DC blocking capacitor connected between said source of driving voltage and one of said driving electrodes and a AC bypass capacitor connected between the output terminal of said DC supply means and the other of said driving electrodes.

5. A piezoelectric transformer circuit comprising a piezoelectric transformer including a pair of driving electrodes and a high-voltage output electrode, a source of a predetermined frequency for applying a driving voltage across said driving electrodes, a rectifier circuit connected to said output electrode, a load circuit energized by said rectifier circuit, a nonlinear element having one electrode connected to the juncture between said rectifier circuit and said load circuit, an impedance element connected to the other electrode of said nonlinear element, and DC voltage applying means connected between one of said driving electrodes and the juncture between said nonlinear element and said impedance element, said nonlinear element bypassing a portion of the output from said rectifier circuit when the output voltage thereof exceeds a predetermined value characteristic to said nonlinear element to create a voltage drop across said impedance element which is supplied to said one driving electrode through said DC voltage supplying means to regulate the output voltage of said piezoelectric transformer.

6. The piezoelectric transformer circuit according to claim 5 wherein said nonlinear element comprises a symmetrical or asymmetrical varistor and said impedance element and said DC voltage applying means are resistors, respectively.

7. The piezoelectric transformer circuit according to claim 5 wherein an AC bypass capacitor is connected across said impedance element.

8. The piezoelectric transformer according to claim 5 wherein said load circuit is comprised by the anode load of a cathode-ray tube.

PO-1050
(5/69)

UNITED STATES PATENT OFFICE
CERTIFICATE OF CORRECTION

Patent No. 3,609,415      Dated September 28, 1971

Inventor(s) Takehiko Kawada

It is certified that error appears in the above-identified patent and that said Letters Patent are hereby corrected as shown below:

Column 2, line 45, the word -- described -- should appear after the word "transformer".

Signed and sealed this 6th day of June 1972.

(SEAL)
Attest:

EDWARD M. FLETCHER, JR.      ROBERT GOTTSCHALK
Attesting Officer      Commissioner of Patents